United States Patent [19]

Hirano et al.

[11] Patent Number: 5,396,554
[45] Date of Patent: Mar. 7, 1995

[54] MULTI-CHANNEL ECHO CANCELING METHOD AND APPARATUS

[75] Inventors: Akihiro Hirano; Akihiko Sugiyama, both of Tokyo, Japan

[73] Assignee: NEC Corporation, Japan

[21] Appl. No.: 851,093

[22] Filed: Mar. 13, 1992

[30] Foreign Application Priority Data

Mar. 14, 1991 [JP] Japan .................................. 3-049445

[51] Int. Cl.⁶ .............................................. H04M 1/00
[52] U.S. Cl. ................................... 379/410; 379/411;
379/388; 370/32.1
[58] Field of Search ............... 370/32.1; 379/388, 410,
379/411, 420, 202, 206, 54, 201; 358/85

[56] References Cited

U.S. PATENT DOCUMENTS 5,027,393 6/1991 Kamamura et al. ............ 379/388 X

FOREIGN PATENT DOCUMENTS 114150A 5/1989 Japan .................................. 379/410
0022631 1/1991 Japan .................................. 379/410

OTHER PUBLICATIONS

B. Widrow et al., "Adaptive Noise Cancelling: Principles and Applications", Proc. of IEEE, vol. 63, No. 12, pp. 1692-1716, Dec. 1975.
J. Nagumo and A. Noda, "A Learning Method for System Identifcation", IEEE Trans. on Automatic Control, vol. AC-12, No. 3, pp. 282-287, Jun. 1967.
B. Widrow et al., "Adaptive Signal Processing", Prentice-Hall, N.J., 1985, pp. 147-153.
M. L. Honing et al, "Adaptive Filters", pp. 145-245, Kluwer Academic Publishers, Hingham, Mass. 02043.

*Primary Examiner*—James L. Dwyer
*Assistant Examiner*—Paul A. Fournier
*Attorney, Agent, or Firm*—Ostrolenk, Faber, Gerb & Soffen

[57] ABSTRACT

Echo canceling method and apparatus for subtracting, from a mixed signal in which echoes produced from a plurality of reception signals are mixed with a transmission signal, a replica of the echoes in order to cancel the echoes in the mixed signal. The replica of the echoes are generated by the steps of selecting the reception signal which is leading in phase and producing a replica of the echoes from the selected reception signal by an adaptive filter. Generally, the replicas are produced by adaptive filters provided in one-to-one correspondence with the mixed signals.

22 Claims, 12 Drawing Sheets

MULTI-CHANNEL ECHO CANCELING METHOD AND APPARATUS

BACKGROUND OF THE INVENTION

1. Field of the Invention

This invention relates to a method of and an apparatus for canceling echoes included in a signal, and more particularly to a method of and apparatus for canceling the echoes of a transmission signal which are derived from a plurality of reception signals and include such echoes in an overlapping relationship.

2. Description of the Related Art

In a system which receives a plurality of reception signals and outputs one or more transmission signals independent of the reception signals, echoes from such reception signals are sometimes mixed into the transmission signal or signals. For example, in a multi-channel television conference system, a plurality of microphones are used in order to pick up speech of a speaker, and a plurality of loudspeakers are provided, in the system on the other side, corresponding to the respective microphones. Accordingly, a plurality of reception signals acquired by the microphones are received from the other side, and such reception signals are reproduced by the respective loudspeakers. Consequently, the microphones in the system will pick up, in addition to the speech of a speaker on one side, a plurality of reception signals from the other side. In this instance, since such reception signals are propagated as sounds in the space between the loudspeakers and microphones, they will be mixed as echoes into signals to be transmitted from the microphones to the other side (that is, transmission signals). Mixture of an echo of a reception signal Into a transmission signal may be similarly caused by crosstalk and so forth.

Mixture of an echo from a reception signal into a transmission signal causes the quality of the transmission signal to deteriorate and, when the transmission signal is speech, significantly Impairs speech clarity and intelligibility. Therefore, there have been repeated attempts to cancel echoes of a transmission signal from a reception signal. When a single reception signal is received, cancellation of echoes is a comparatively easy technique and is in practical use. Cancellation of echoes derived from a plurality of reception signals has so far been attempted by two multi-channel echo canceling methods: one employs án apparatus of the serially connected type, and the other employs an apparatus of the linear combiner type.

FIG. 1 shows, in a block diagram, the construction of a multi-channel echo canceling apparatus of the serially connected type for use with a system for two channels of transmission and reception signals.

In the system shown, a first reception signal 501 inputted from the outside is reproduced by a first loudspeaker 503, and similarly a second reception signal 502 is reproduced by a second loudspeaker 504. First and second transmission signals 512 and 513, which are speech uttered by a speaker 511, are inputted to first and second microphones 509 and 510, respectively. Here, the loudspeakers 503 and 504, microphones 509 and 510 and speaker 511 are in the same acoustic space and acoustically coupled to one another. Consequently, to the first transmission signal 512, a first echo 505 (which is derived from the first reception signal 501 reproduced by the first loudspeaker 503 and coming to the first microphone 509 by way of a spatial acoustic path) and a second echo 506 (which is derived from the second reception signal 502 reproduced by the second loudspeaker 504 and coming to the first microphone 509) are added together. A first mixed signal 514, including the first transmission signal 512 and the echoes 505 and 506, is obtained from the first microphone 509. Similarly, a third echo 507 from the first reception signal 501 and a fourth echo 508 from the second reception signal 502 are added to the second transmission signal 513, and consequently, a second mixed signal 515 of the second transmission signal 513 with the echoes 507 and 508 is obtained from the second microphone 510.

The serially connected multi-channel echo canceling apparatus 520 includes four adaptive filters 521 to 524 and four subtracters 525 to 528. The apparatus 520 cancels the first and second echoes 505 and 506 of the first mixed signal 514 and the third and fourth echoes 507 and 508 of the second mixed signal 515 in the manner described below.

In particular, in order to cancel the echoes 505 and 506 mixed in the first mixed signal 514, a pseudo echo (echo replica) corresponding to the first echo 505 is first produced by the first adaptive filter 521 to which the first reception signal 501 is inputted, and the echo replica is then subtracted from the first mixed signal 514 by the first subtracter 525. The first adaptive filter 521 has filter coefficients which are controlled so as to minimize the output of the first subtracter 525. Another echo replica corresponding to the second echo 506 is then produced by the second adaptive filter 522 to which the second reception signal 502 is inputted, and the echo replica is subtracted from the output of the first subtracter 525 by the second subtracter 526. The second adaptive filter 522 similarly has filter coefficients which are controlled so as to minimize the output of the second subtracter 526. The output of the second subtracter 526 is produced as the first output signal 516 of the serially connected multi-channel echo canceling apparatus 520. Upon echo cancellation, the first adaptive filter 521 and first subtracter 525 and the second adaptive filter 522 and second subtracter 526 may otherwise be reversed in order to remove the second echo 506 first.

Similarly, in order to cancel the echoes 507 and 508 mixed in the second mixed signal 515, an echo replica corresponding to the third echo 507 is first produced by the third adaptive filter 523 to which the first reception signal 501 is inputted, and the echo replica is subtracted from the second mixed signal 515 by the third subtracter 527. The third adaptive filter 523 has filter coefficients which are controlled so as to minimize the output of the third subtracter 527. Another echo replica corresponding to the fourth echo 508 is then produced by the fourth adaptive filter 524 to which the second reception signal 502 is inputted, and the echo replica is subtracted from the output of the third subtracter 527 by the fourth subtracter 528. The fourth adaptive filter 524 similarly has filter coefficients which are controlled so as to minimize the output of the subtracter 528. The output of the fourth subtracter 528 is produced as the second output signal 517 of the echo canceling apparatus 520. Upon echo cancellation, the third adaptive-filter 523 and third subtracter 527 and the fourth adaptive filter 524 and fourth subtracter 528 may otherwise be reversed in order to remove the fourth echo 508 first. The echoes 505 to 508 of the first and second mixed signals 514 and 515 are canceled in this manner, and signals after such cancellation are the first and second output signals 516 and 517 and are outputted from the echo canceling apparatus 520.

A multi-channel echo canceling apparatus of the linear combiner type is shown in FIG. 2. Referring to FIG. 2, the echo canceling apparatus 530 shown cancels echoes 505 to 508 mixed in mixed signals 514 and 515 in a manner similar to the one described above. The echo canceling apparatus 530 thus includes four adaptive filters 531 to 534 and two subtracters 539 and 540. The echo canceling apparatus 530 operates in the following manner to cancel the echoes 505 to 508 of the first and second mixed signals 514 and 515 and output signals after such echo cancellation as first and second output signals 516 and 517.

In particular, in order to cancel the echoes 505 and 506 mixed in the first mixed signal 514, an echo replica 535 corresponding to the first echo 505 is first produced by the first adaptive filter 531 to which the first reception signal 501 is inputted, and another echo replica 536 corresponding to the second echo 506 is produced by the second adaptive filter 532 to which the second reception signal 502 is Inputted. The echo replicas 535 and 536 corresponding to the first and second echoes 505 and 506, respectively, are subtracted from the first mixed signal 514 by the first subtracter 539. The first and second adaptive filters 531 and 532 have filter coefficients which are controlled so as to minimize the output of the first subtracter 539. The output of the first subtracter 539 is produced as the first output signal 516 of the echo canceling apparatus 530.

In order to cancel the echoes 507 and 508 mixed in the second mixed signal 515, the first reception signal 501 is inputted to the third adaptive filter 533, by which an echo replica 537 corresponding to the third echo 507 is produced, and the second reception signal 502 is inputted to the fourth adaptive filter 534, by which another echo replica 538 corresponding to the fourth echo 508 is produced. The echo replicas 537 and 538 corresponding to the third and fourth echoes 507 and 508, respectively, are subtracted from the second mixed signal 515 by the second subtracter 540. The third and fourth adaptive filters 533 and 534 are controlled so as to minimize the output of the second subtracter 540. The output of the second subtracter 540 is produced as the second output signal 517 of the echo canceling apparatus 530.

We will now examine the operation of the conventionally proposed multi-channel echo canceling apparatus described above. First, we investigate a multi-channel echo canceling apparatus of serially connected type shown in FIG. 1. In this apparatus, the output of the first subtracter 525 includes the second echo 506 which cannot be canceled by a echo replica from the first adaptive filter 521. The step size of the first adaptive filter 521 must be extremely small because of this second echo 506 interfering the convergence of the first adaptive filter 521. As result, the convergence of the first adaptive filter 521 becomes very slow. And the accuracy of the convergence goes bad because of the existence the high level interfering signal. The rate and accuracy of the convergence of the second adaptive filter 522 respectively becomes slow and bad, too, because the rate and accuracy of the convergence of the first adaptive filters respectively are slow and bad. The same result similarly applied to the both third and fourth adaptive filters 523 and 524.

One of the principal applications of such multi-channel echo canceling apparatus is in multi-channel television conference systems. In this type of system, a speaker's speech picked up simultaneously by a plurality of microphones causes reception signals from the other side. Accordingly, each of the reception signals has an attenuation amount and a time delay basically corresponding to the distance between the speaker and the microphone, and the reception signals of the channels have very strong cross-correlations. Therefore, the following analysis proceeds on the assumption that, in the linear combiner type multi-channel echo canceling apparatus shown in FIG. 2, the second reception signal 502 is equivalent to a signal obtained by delaying the first reception signal 501, echo paths which can be approximated to a transversal filter, and an adaptive transversal filter is employed for the adaptive filters 531 to 534.

The first and second reception signals 501 and 502 at a time n are represented by $x_1(n)$ and $x_2(n)$, respectively, and the echo mixed In the first mixed signal 514 is represented by $d(n)$. When the time difference between the first and second reception signals 501 and 502 is represented by $n_d$ ($n_d$: integer, $n_d \geq 0$), $$x_2(n) = x_1(n - n_d) \tag{1}$$

For the simplification, it is assumed that all of the spatial acoustic paths from the first and second loudspeakers 503 and 504 to the first and second microphones 509 and 510 have an equal impulse response length, and the impulse response length is represented by N, the impulse response of the spatial acoustic path from the first loudspeaker 503 to the first microphone 509 is represented by $h_{1,i}$, and the impulse response of the spatial acoustic path from the second loudspeaker 504 to the first microphone 509 is represented by $h_{2,i}$. Thus, the echo $d(n)$ is given by $$d(n) = \sum_{i=0}^{N-1} h_{1,i} x_1(n - i) + \sum_{i=0}^{N-1} h_{2,i} x_2(n - i) \tag{2}$$

Substituting equation (1) into equation (2) to cancel $x_2$ yields $$d(n) = \tag{3}$$

$$\sum_{i=0}^{n_d-1} h_{1,i} x_1(n - i) + \sum_{i=n_d}^{N-1} (h_{1,i} + h_{2,i-n_d}) x_1(n - i) + \sum_{i=N-n_d}^{N-1} h_{2,i} x_1(n - n_d - i)$$

An echo replica $d(n)$ to be produced by adding the output of the first and second adaptive filters 531 and 532 is given when the i-th weighting coefficients of the first and second adaptive filters 531 and 532 are represented by $w_{1,i}(n)$ and $w_{2,i}(n)$, respectively, by $$d(n) = \sum_{i=0}^{N-1} w_{1,i}(n) x_1(n - i) + \sum_{i=n_d}^{N-1} w_{2,i}(n) x_2(n - i) \tag{4}$$

Substituting equation (1) into equation (4) to cancel $x_2(n)$, yields $$d(n) = \sum_{i=0}^{n_d-1} w_{1,i}(n)x_1(n - i) + \quad (5)$$

$$\sum_{i=n_d}^{N-1} \{w_{1,i}(n) + w_{2,i-n_d}(n)\}x_1(n - i) +$$

$$\sum_{i=N-n_d}^{N-1} w_{2,i}(n)x_1(n - n_d - i)$$

Consequently, the residual echo $e(n)$ is given by $$\begin{aligned}e(n) &= d(n) - \hat{d}(n) \quad (6)\\
&= \sum_{i=0}^{n_d-1} \{h_{1,i} - w_{1,i}(n)\}x_1(n - i) +\\
&\quad \sum_{i=n_d}^{N-1} \{h_{1,i} + h_{2,i-n_d} - w_{1,i}(n) - w_{2,i-n_d}(n)\}x_1(n - 1) +\\
&\quad \sum_{i=N-n_d}^{N-1} \{h_{2,i} - w_{2,i}(n)\}x_1(n - n_d - i)\end{aligned}$$

From equation (6), the requirements by which echoes can be canceled completely are given by $$h_{1,i} = w_{1,i}(n) \qquad i = 0, \ldots, n_d - 1 \quad (7)$$
$$h_{1,i} + h_{2,i-n_d} = w_{1,i}(n) + w_{2,i-n_d}(n) \quad i = n_d, \ldots, N - 1$$
$$h_{2,i} = w_{2,i}(n) \qquad i = N - n_d, \ldots, N - 1$$

From equation (7), it can be seen that $w_{1,0}(n), \ldots, w_{1,n_d-1}(n)$ and $w_{2,N-n_d}(n), \ldots, w_{2,N-1}(n)$ are determined decisively, but $w_{1,n_d}(n), \ldots, w_{1,N-1}(n)$ and $w_{2,0}(n), \ldots, w_{2,N-n_d-1}(n)$ each have an indefinite number of solutions.

Incidentally, an adaptive filter is controlled by a known controlling method which is based on the LMS (least-mean-square) algorithm or on a learning method. Details of the LMS algorithm are disclosed, for example, in B. Widrow et al., "Adaptive Noise Canceling: Principles and Applications", Proc. of IEEE, Vol. 63, No. 12, pp.1692–1716, December 1975 (hereinafter referred to as reference 1). Meanwhile, details of such learning methods are disclosed, for example, in J. Nagumo and A. Noda, "A Learning Method for System Identification", IEEE Trans. on Automatic Control, Vol. AC-12, No. 3, pp.282–287, June 1967 (hereinafter referred to as reference 2). It is to be noted that a learning method is sometimes called a learning identification method or normalized LMS (NLMS).

Here, it is assumed that the LMS algorithm is used to control the adaptive filters 531 and 532, and for simplification of description, the adaptive filters 531 and 532 have the same step size and the reception signals are white noise. When the step size is represented by $\mu$, the weighting coefficients of the adaptive filters 531 and 532 are updated as given respectively by $$w_{1,i}(n+1) = w_{1,i}(n) + \mu e(n)x_1(n-i) \quad (8)$$

$$w_{2,i}(n+1) = w_{2,i}(n) + \mu e(n)x_1(n-n_d-i) \quad (9)$$

Equation (6) is then substituted into equations (8) and (9) to obtain the mathematical expectation values for both sides.

First, when $i = 0, 1, \ldots, n_d - 1$, $$E[w_{1,i}(n+1)] = E[w_{1,i}(n)] + \mu\sigma_x^2\{h_{1,i} - E[w_{1,i}(n)]\} \quad (10)$$

$$E[w_{2,N-i-1}(n+1)] = E[w_{2,N-i-1}(n)] + \mu\sigma_x^2\{h_{2,N-i-1} - E[w_{2,N-i-1}(n)]\} \quad (11)$$

where $E[X]$ are the mathematical expectation values for the variable $X$, and $\sigma_x^2$ is the average power of the reception signals 501 and 502. Solutions to equations (10) and (11) are given respectively by $$w_{1,i}(n) = h_{1,i} + (1 - \mu\sigma_x^2)^n\{E[w_{1,i}(0)] - h_{1,i}\} \quad (12)$$

$$w_{2,N-i-1}(n) = h_{2,N-i-1} + (1 - \mu\sigma_x^2)^n\{E[w_{2,N-i-1}(0)] - h_{2,N-i-1}\} \quad (13)$$

and they converge to optimum values when $$0 < \mu < \frac{2}{\sigma_x^2} \quad (14)$$

The results of equations (12), (13) and (14) coincide with an ordinary LMS algorithm, that is, an LMS algorithm, when only one reception signal is involved. Otherwise, when $i = n_d, n_d+1, \ldots, N-1$, $$E[w_{1,i}(n+1)] = E[w_{1,i}(n)] + \mu\sigma_x^2\{h_{1,i} - E[w_{1,i}(n)]\} + \mu\sigma_x^2\{h_{2,i-n_d} - E[w_{2,i-n_d}(n)]\} \quad (15)$$

$$E[w_{2,i-n_d}(n+1)] = E[w_{2,i-n_d}(n)] + \mu\sigma_x^2\{h_{1,i} - E[w_{1,i}(n)]\} + \mu\sigma_x^2\{h_{2,i-n_d} - E[w_{2,i-n_d}(n)]\} \quad (16)$$

and their solutions are given respectively by $$E[w_{1,i}(n)] = h_{1,i} + \tfrac{1}{2}\{(1 - 2\mu\sigma_x^2)^n + 1\}\{E[w_{1,i}(0)] - h_{1,i}\} + \tfrac{1}{2}\{(1 - 2\mu\sigma_x^2)^n - 1\}\{E[w_{2,i-n_d}(0)] - h_{2,1-n_d}\} \quad (17)$$

$$E[w_{2,i-n_d}(n)] = h_{2,i} + \tfrac{1}{2}\{(1 - 2\mu\sigma_x^2)^n + 1\}\{E[w_{2,i-n_d}(0)] - h_{2,1-n_d}\} + \tfrac{1}{2}\{(1 - 2\mu\sigma_x^2)^n - 1\}\{E[w_{1,i}(0)] - h_{1,i}\} \quad (18)$$

Accordingly, when $$0 < \mu < \frac{1}{\sigma_x^2} \quad (19)$$

they converge respectively to $$E[w_{1,i}(n)] = h_{1,i} + \tfrac{1}{2}\{E[w_{1,i}(0)] - h_{1,i}\} - \tfrac{1}{2}\{E[w_{2,i-n_d}(0)] - h_{2,i-n_d}\} \quad (20)$$

$$E[w_{2,i-n_d}(n)] = h_{2,i} + \tfrac{1}{2}\{E[w_{2,i-n_d}(0)] - h_{2,i-n_d}\} - \tfrac{1}{2}\{E[w_{1,i}(0)] - h_{1,i}\} \quad (21)$$

In this instance, the maximum value of the step size is restricted to one half that of the case of an ordinary LMS algorithm, and consequently, the converging rate is slow and in addition the mathematical expectations do not converge to optimal values. Generally, when M channels of reception signals are involved, maximum values of the step sizes are restricted to $1/M$ of the values in the case of an ordinary LMS algorithm.

The first and second adaptive filters 531 and 532 used to cancel echoes mixed in the first mixed signal 514 have been examined above, and similar results are obtained with regard to the third and fourth adaptive filters 533 and 534. Further, while the LMS algorithm is employed as a controlling method for the adaptive filters, additional employment of the learning method results in convergence to the same values, and in this case as well, the step sizes are similarly restricted to a low level.

Thus, the multi-channel echo canceling methods and apparatus proposed to date that have been described above are disadvantageous in that, since the step sizes are restricted to a low level, convergence of the adaptive filter is slow, and the weighting coefficient of the adaptive filter does not converge to their optimum values. In particular, when the echo canceling methods and apparatus are applied to a multi-channel television conference system, the low converging rate is a very serious problem since the number of taps of adaptive filters is very great due to the fact that the principal cause of echoes is spatial acoustic propagation.

SUMMARY OF THE INVENTION

It is an object of the present invention to provide a multi-channel echo canceling method wherein echoes of a mixed signal in which a transmission signal is mixed with the echoes produced from a plurality of reception signals can be canceled with a reduced scale of hardware construction.

It is another object of the present invention to provide a multi-channel echo canceling method wherein, when echoes in a mixed signal which are derived from a plurality of reception signals are to be canceled, weighting coefficients of the adaptive filters converge quickly to optimum values.

It is a further object of the present invention to provide a multi-channel echo canceling apparatus wherein echoes derived from a plurality of reception signals can be canceled stably In quick convergence.

In order to attain these objects, according to one aspect of the present invention, there is provided a multi-channel echo canceling method of subtracting, from a mixed signal or signals in which echoes produced from a plurality of reception signals mixed with a transmission signal or signals, a replica of the echoes in order to cancel the echoes of the mixed signal or signals, comprising at least the steps of selecting the reception signal that is most leading in phase, and producing a replica of the echoes from the selected reception signal.

The selected reception signal is inputted to adaptive filters provided in one-to-one correspondence with the mixed signal or signals to produce a replica of the echoes.

According to another aspect of the present invention, there is provided a multi-channel echo canceling apparatus for subtracting, from a mixed signal or signals in which echoes produced from a plurally of reception signals are mixed with a transmission signal or signals, a replica of the echoes in order to cancel the echoes of the mixed signal or signals, comprising a phase difference detecting circuit for receiving the reception signals and detecting the reception signal which is most leading in phase, a selector for receiving the reception signals and selectively outputting, in accordance with the results of the detection by said phase difference detecting circuit, the reception signal which is most leading in phase, an adaptive filter or filters provided in one-to-one correspondence with the mixed signal or signals for receiving the output of the selector and producing and outputting a replica of the echo, and a subtracter or subtracters provided in one-to-one correspondence with the mixed signal or signals for subtracting the output or outputs of the adaptive filter or filters from the corresponding mixed signal or signals, said adaptive filter or filters being controlled so as to minimize the output or outputs of the subtracter or subtracters.

With the multi-channel echo canceling method and apparatus of the present invention, echoes can be canceled by a number of adaptive filters equal to 1/M (M is a number of channels of reception signals) that of the prior art multi-channel echo canceling methods and apparatus described above, and consequently, the scale of hardware construction can be reduced. Further, since filter coefficients converge stably with a greater step size than that of the methods and apparatus of the prior art, the converging time is decreased. In addition, the present invention provides a solution to the problem that the coefficients of a plurality of adaptive filters cannot converge to their optimal values due to the influence of the cross-correlation.

The above and other objects, features and advantages of the present invention will become apparent from the following description referring to the accompanying drawings which illustrate an example of a preferred embodiment of the present invention.

DETAILED DESCRIPTION OF THE PREFERRED EMBODIMENT

Figure 3:
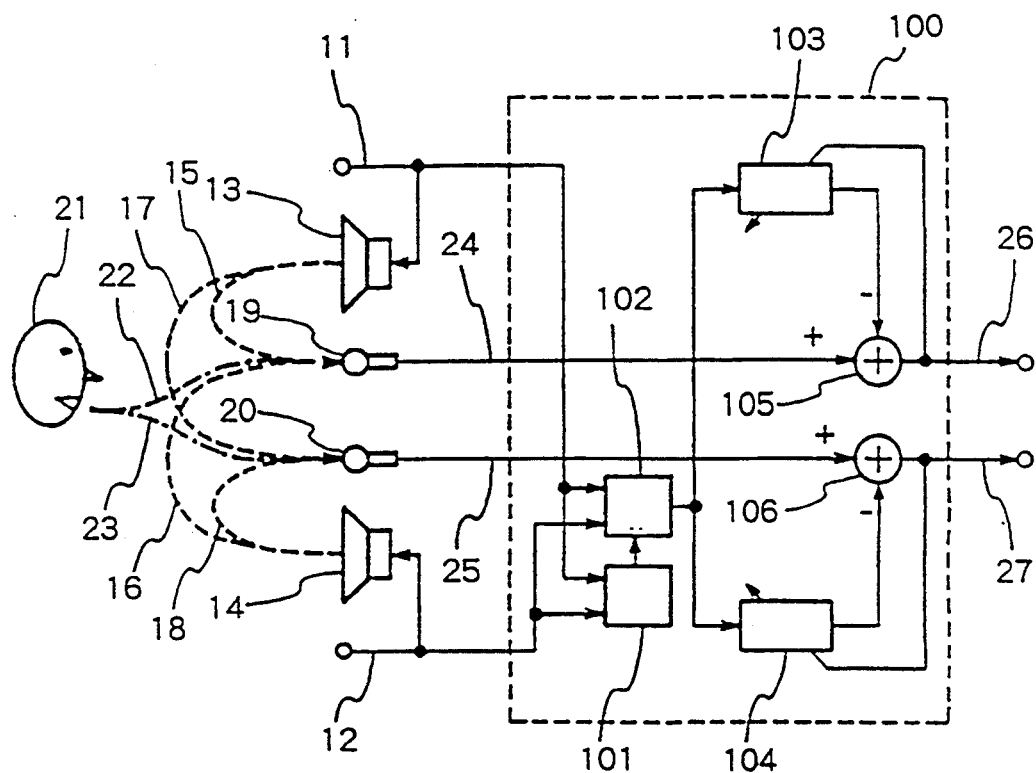
FIG. 3 is a block diagram showing a system including a multi-channel echo canceling apparatus according to an embodiment of the present invention.

Referring first to FIG. 3, there is shown a system including a multi-channel echo canceling apparatus according to a preferred embodiment of the present invention. In the system shown, two reception signals 11 and 12 are reproduced by two loudspeakers 13 and 14, respectively. Meanwhile, two transmission signals 22 and 23 from a same speaker 21 are inputted to two microphones 19 and 20, respectively. Here, the speaker 21, loudspeakers 13 and 14 and microphones 19 and 20 are disposed in the same acoustic space. Consequently, the echo 15 from one reception signal 11 and the other echo 16 from the other reception signal 12 are inputted in addition to the transmission signal 22 into one microphone 19 by way of spatial acoustic paths from the loudspeakers 13 and 14 to the microphone 19. As a result, the output signal of the microphone 19 contains the mixed echoes 15 and 16 and constitutes a mixed signal 24. Similarly, the output signal of the other microphone 20 contains the mixed echoes 17 and 18 in addition to the other transmission signal 23 and constitutes the other mixed signal 25. In order to cancel the echoes 15 to 18 mixed in the mixed signals 24 and 25, a multi-channel echo canceling apparatus 100 according to the present invention is provided. In this instance, since the number of reception signals is two, the multi-channel echo canceling apparatus 100 is designed for two channels. It is to be noted that each of the transmission signals 22 and 23 is naturally independent of each of the reception signals 11 and 12.

The multi-channel echo canceling apparatus 100 includes a phase difference detecting circuit 101, a selector 102, two adaptive filters 103 and 104 provided corresponding to the mixed signals 24 and 25, respectively, and two subtracters 105 and 106 provided at the outputs of the adaptive filters 103 and 104, respectively. The phase difference detecting circuit 101 receives the first and second reception signals 11 and 12, detects which one of the two reception signals 11 and 12 is leading in phase, and supplies the results of this detection to the selector 102. The selector 102 receives the first and second reception signals 11 and 12, selects one of the two reception signals 11 and 12 which has been determined to be leading in phase by the phase difference detecting circuit 101, and supplies the thus selected reception signal to the first and second adaptive filters 103 and 104.

The first adaptive filter 103 receives the reception signal selected by the selector 102, produces an echo replica corresponding to the echoes mixed in the first mixed signal 24, and supplies the echo replica to the first subtracter 105. The first subtracter 105 subtracts from the first mixed signal 24 the echo replica outputted from the first adaptive filter 103 and corresponding to the echoes mixed in the first mixed signal 24, and outputs the result of this subtraction as the first output signal 26 of the multi-channel echo canceling apparatus 100. The first adaptive filter 103 is controlled so as to minimize the first output signal 26.

Similarly, the second adaptive filter 104 receives the reception signal selected by the selector 102, produces an echo replica corresponding to the echoes mixed in the second mixed signal 25, and supplies the echo replica to the second subtracter 106. The second subtracter 106 subtracts from the second mixed signal 25 the echo replica outputted from the second adaptive filter 104 corresponding to the echoes mixed in the second mixed signal 25 and outputs the result of this subtraction as the second output signal 27 of the multi-channel echo canceling apparatus 100. The second adaptive filter 104 is controlled so as to minimize the second output signal 27. Operation of the first and second adaptive filters 103 and 104 will be described subsequently on the assumption that each of them is, for example, constituted from an adaptive transversal filter based on the LMS algorithm. The construction of such an adaptive transversal filter and contents of the LMS algorithm appear to be well-known to those skilled in the art.

The number of taps of the first and second adaptive filters 103 and 104 is represented by N', the output of the selector 102, which is an input signal to the first and second adaptive filters 103 and 104 at time n, can be represented by x(n). At the same time, the output of the first subtracter 105, which is an error signal to the first adaptive filter 103, can be represented by $e_1(n)$, while the i-th coefficient of the first adaptive filter 103 can be represented by $w_{1,i}(n)$. Similarly, the output of the second subtracter 106, which is an error signal to the second adaptive filter 104, and the i-th coefficient of the second adaptive filter 104 can be represented by $e_2(n)$ and $w_{2,i}(n)$, respectively. The output $y_1(n)$ of the first adaptive filter 103 is given by $$y_1(n) = \sum_{i=0}^{N'-1} w_{1,i}(n) x(n - i) \tag{22}$$

and the output $y_2(n)$ of the second adaptive filter 104 is given by $$y_2(n) = \sum_{i=0}^{N'-1} w_{2,i}(n) x(n - i) \tag{23}$$

When the first and second adaptive filters 103 and 104 have an equal step size $\mu$, updated weighting coefficients $w_{1,i}(n+1)$ and $w_{2,i}(n+1)$ are given respectively by $$w_{1,i}(n+1) = w_{1,i}(n) + \mu e_1(n) \times (n - i) \tag{24}$$

and $$w_{2,i}(n+1) = w_{2,i}(n) + \mu e_2(n) \times (n - i) \tag{25}$$

If it is assumed that the second reception signal 12 corresponds to the delayed signal of the first reception signal 11, the echoes d(n) mixed in the first mixed signal 14 can be given by the equation (3). This condition is easily realized with, for example, a multi-channel television conference system as described above. Here, by setting $$h_i = \begin{cases} h_{1,i} & i = 0, \ldots, n_d - 1 \\ h_{1,i} + h_{2,i-n_d} & i = n_d, \ldots, N - 1 \\ h_{2,i-n_d} & i = N, \ldots, N + n_d - 1 \end{cases} \tag{26}$$

the echoes d(n) are given by $$d(n) = \sum_{i=0}^{N+n_d-1} h_i x_1(n - i). \tag{27}$$

From this equation (27), it can be understood that the echoes d(n) are equivalent to the output of a transversal filter having weighting coefficients of $h_i$ ($i=0, 1, \ldots, N+n_d-1$) and receiving the reception signals $x_1(n)$, which are leading in phase. Accordingly, the echoes can be canceled by supplying the first or second reception signal 11 or 12, whichever is leading in phase, to an adaptive filter to produce a replica of the echoes and then subtracting the replica of the echoes from the mixed signal. Similarly, the echoes mixed into the second mixed signal can be canceled.

Next, a phase difference detecting circuit suitable for use with the multi-channel echo canceling method and apparatus will be described with reference to FIG. 4. The phase difference detecting circuit can be described as being constructed such that it can detect the most leading reception signal from the reception signals $201_1$ to $201_M$ of M channels ($M \geq 2$). If $M=2$, the phase difference detecting circuit can be applied as it is to the phase difference detecting circuit 101 of the multi-channel echo canceling apparatus 100 described above with reference to FIG. 3.

Figure 4:
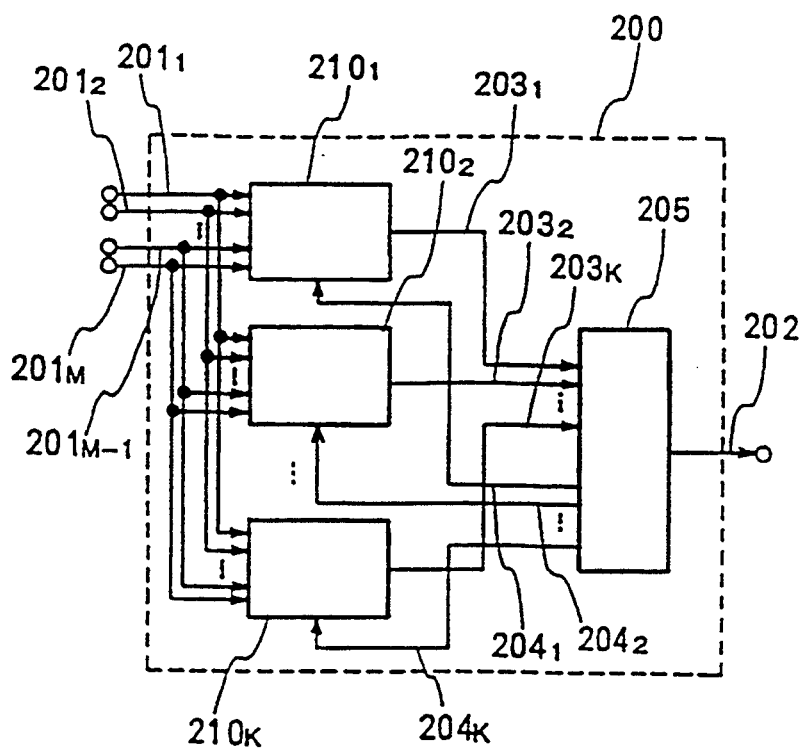
FIG. 4 is a block diagram showing a phase difference detecting circuit of the multi-channel echo canceling apparatus of FIG. 3.

The phase difference detecting circuit 200 shown in FIG. 4 is composed of K ($K \geq 1$) phase comparing circuits $210_1$ to $210_K$ and a controlling circuit 205 and receives a plurality of reception signals $201_1$ to $201_M$, detects a most leading reception signal, and outputs a result 202 of the detection. The K phase comparing circuits $210_1$ to $210_K$ have the same construction and operate in a similar manner. Therefore, when description is given of the individual phase comparing circuits, the suffix i will be omitted and the components will be referred to as, for example, phase comparing circuits 210, controlling signals 204, and comparison results 203.

The phase comparing circuit 210 receives the reception signals $201_1$ to $201_M$ of the M channels and compares the phases of the two reception signals of $201_1$ to $201_M$ which are designated by the controlling signal 204 transmitted thereto from the controlling circuit 205. The phase comparing circuit 210 then supplies the result 203 of the comparison to the controlling circuit 205.

The controlling circuit 205 receives the detection results $203_1$ to $203_K$ outputted from the K phase comparing circuits $210_1$ to $210_K$, respectively, and supplies controlling signals $204_1$ to $204_K$ designating reception signals to be compared in phase with each other to the phase comparing circuits $210_1$ to $210_K$, respectively. The controlling circuit 205 detects the most leading reception signal using the comparison results $203_1$ to $203_K$ from the phase comparing circuits $210_1$ to $210_K$, and outputs the result of the detection as an output 202 of the phase difference detecting circuit 200.

Since comparison in phase is performed for each two reception signals, It may be performed in various manners. In particular, only one phase comparing circuit may be used which first compares the first and second reception signals $201_1$ and $201_2$ and then compares the more leading reception signal in the two signals $201_1$ and $201_2$ with a third reception signal $201_3$, and then successively performs $M-1$ comparing operations in a similar manner. Alternatively, a plurality of phase comparing circuits may be used simultaneously which each detect the most leading reception signal of two signals and repeat this detecting operation to detect the most leading reception signal. Alternatively, when the reception signals of M channels are involved, $M(M-1)/2$ phase detecting circuits may be prepared such that phase comparison is performed simultaneously for all possible combinations of two channels from among the M-channel reception signals. When the last technique is employed, the most leading reception signal can be detected without using any of the phase comparing circuits repetitively, and the time required for detection is minimized. Or alternatively, K reception signals may be selected from among the reception signals as objects for detection such that a reception signals which are determined by K phase comparing circuits to be lagging in phase are excepted from the objects for detection, and this procedure is repeated until only the most leading reception signals is left. It is to be noted that, when reception signals of two channels are involved, the phase difference between them can be detected by means of a single phase comparing circuit.

Figure 5:
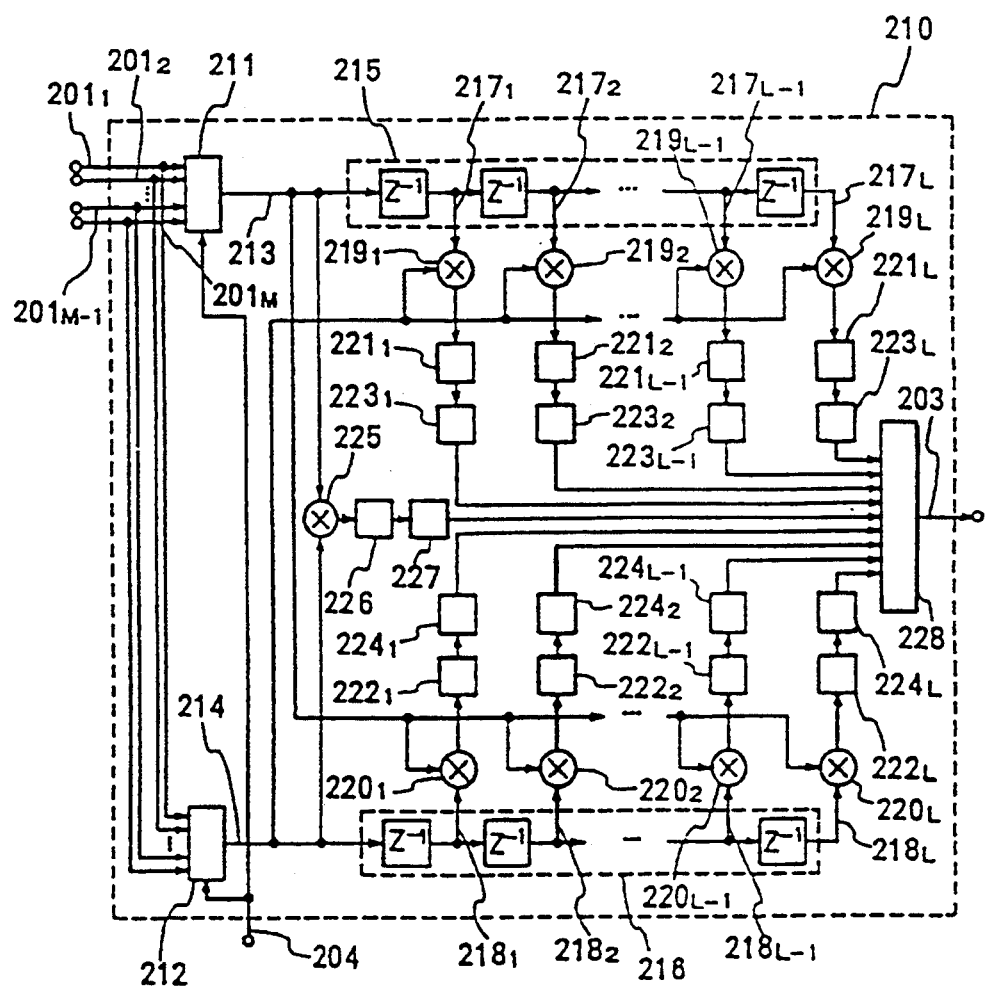
FIG. 5 is a block diagram showing a phase comparing circuit for use with the phase difference detecting circuit of FIG. 4.

Details of the phase comparing circuit 210 will now be described. FIG. 5 shows, in a block diagram, a first form of construction of the phase comparing circuit 210. Referring to FIG. 5, the phase comparing circuit 210 shown receives M channels of reception signals $201_1$ to $201_M$, compares phases of those two reception signals $201_1$ to $201_M$ which are designated by a controlling signal 204, and outputs a result 203 of the comparison. Comparison in phase is performed using a cross correlation function between two reception signals. Here, the two designated reception signals are referred to as a first reception signal 213 and a second reception signal 214. When the values of the first and second reception signals 213 and 214 at time n are represented by $x_1(n)$ and $x_2(n)$, respectively, the cross correlation function $R_{12}(n, m)$ between the two signals for a time difference m at time n is given by $$R_{12}(n, m) = E[x_1(n)x_2(n+m)] \tag{28}$$

If a steady reception signal $x_1(n)$ and another signal $x_2(n)$ produced by delaying the same by an $n_d$ sample distance (i.e., $x_2(n) = x_1(n-n_d)$) are assumed, since $$\begin{aligned} E[(x_1(n) - x_2(n+m))^2] &= E[(x_1(n) - x_1(n-n_d+m))^2] \\ &= E[x_1^2(n)] - 2E[x_1(n)x_2(n+m)] \\ &\quad + E(x_2^2(n+m)] \\ &= E[x_1^2(n)] + E[x_2^2(n+m)] - 2R_{12}(n,m) \end{aligned} \tag{29}$$

the cross correlation function $R_{12}(n, m)$ between $x_1(n)$ and $x_2(n)$ is given by $$R_{12}(n,m) = \frac{E[x_1^2(n)] + E[x_2^2(n+m)] - E[(x_1(n) - x_1(n-n_d+m))^2]}{2} \tag{30}$$

When $x_1(n)$ and $x_2(n)$ are in a stable condition, the expressions $E[x_1^2(n)]$ and $E[x_2^2(n)]$ are constant, and accordingly, by setting $$C = E[x_1^2(n)] + E[x_2^2(n-m)] \tag{31}$$

the following expression is obtained:

$$R_{12}(n,m) = \frac{C - E[(x_1(n) - x_1(n-n_d+m))^2]}{2} \tag{32}$$

Accordingly, $R_{12}(n, m)$ is at a maximum when $m=n_d$.

When $x_1(n)$ and $x_2(n)$ are opposite in phase, that is, when $x_2(n) = -x_1(n-n_d)$, $$E[(x_1(n) + x_2(n+m))^2] = E[(x_1(n) - x_1(n-n_d+m))^2] \tag{33}$$

-continued $$= E[x_1^2(n)] + E[x_2^2(n + m)] + 2R_{12}(n,m)$$

and accordingly, $R_{12}(n, m)$ is given by $$R_{12}(n,m) = -\frac{C - E[(x_1(n) - x_1(n - n_d + m))^2]}{2} \quad (34)$$

Accordingly, when $m=n_d$, $R_{12}(n, m)$ is at a minimum value, and its absolute value is at a maximum value.

If, based on this fact, the sign of the time difference which maximizes the absolute value of the cross correlation function $R_{12}(n, m)$ is used, it can be determined which of the first and second reception signals 213 or 214 is leading in phase.

Selection of two signals to be compared In phase is performed by two selectors 211 and 212. One of two signals designated by the controlling signal 204 for designating two reception signals as objects for comparison in phase is selected by the first selector 211 to which the reception signals $201_1$ to $201_M$ are inputted, and the selected signal is outputted as a first reception signal 213. Similarly, the other of the two signals designated by the controlling signal 204 is selected by the second selector 212 to which the reception signals $201_1$ to $201_M$, and the selected signal is outputted as a second reception signal 214.

A calculating circuit for calculating the cross correlation functions in which the sign of the time difference m is positive is composed of a first L tap tapped-delay-line 215, L multipliers $219_1$ to $219_L$, and L integrators $221_1$ to $221_L$. The L multipliers $219_1$ to $219_L$ generally make up a first multiplier set while the L integrators $221_1$ to $221_L$ generally make up a first integrator set. The first tapped-delay-line 215 delays the first reception signal 213 by one sampling period with each of the delay elements thereof. The L multipliers $219_1$ to $219_L$ provided corresponding to the L outputs $217_1$ to $217_L$ respectively multiply L outputs $217_1$ to $217_L$ of the first tapped-delay-line 215 by the second reception signal 214. Outputs of the multipliers $219_1$ to $219_L$ are integrated by the integrators $221_1$ to $221_L$, respectively. Outputs of the integrators $221_1$ to $221_L$, that is, results of the integration, are values of the cross correlation function $R_{12}(n, m)$ corresponding to $m=1, \ldots, L$, respectively.

Similarly, a calculating circuit for calculating the cross correlation functions in which the sign of the time difference m is negative is composed of a second L tap tapped-delay-line 216, L multipliers $220_1$ to $220_L$, and L integrators $222_1$ to $222_L$. The L multipliers $220_1$ to $220_L$ generally make up a second multiplier set while the L integrators $222_1$ to $222_L$ generally make up a second integrator set. The L multipliers $220_1$ to $220_L$ respectively multiply L outputs $218_1$ to $218_L$ of the second tapped-delay-line 216 by the first reception signal 213. Outputs of the multipliers $220_1$ to $220_L$ are integrated by the integrators $222_1$ to $222_L$, respectively. Results of such integration are values of the cross correlation function $R_{12}(n, m)$ corresponding to $m=-1, -2, \ldots, -L$, respectively.

A calculating circuit for calculating the cross correlation function in which the time difference m is equal to zero is composed of a multiplier 225 and an integrator 226. The multiplier 225 multiplies the first and second reception signals 213 and 214, and the output of the multiplier 225 is integrated by the integrator 226. The result of this integration is $R_{12}(n, 0)$ among the cross correlation functions.

Judgment of phase difference is performed by $2L+1$ absolute value calculating circuits $223_1$ to $223_L$, $224_1$ to $224_L$, 227 and a comparator 228. Of these absolute value calculating circuits, the first L absolute value calculating circuits $223_1$ to $223_L$ generally make up a first absolute value calculating circuit set and are provided on the output sides of the integrators $221_1$ to $221_L$, respectively, which belong to the first integrator set, such that they output the absolute values of the outputs of the corresponding integrators. Of the remaining $L+1$ absolute value calculating circuits, the L absolute value calculating circuits $224_1$ to $224_L$ generally make up a second absolute value calculating circuit set and are provided on the output sides of the integrators $222_1$ to $222_L$, respectively, which belong to the second integrator set, such that they output the absolute values of the outputs of the corresponding integrators. The remaining absolute value calculating circuit 227 is provided on the output side of the integrator 226 which corresponds to the time difference m equal to zero such that it outputs the absolute value of the output of the integrator 226.

The comparator 228 compares outputs of the $2L+1$ absolute value calculating circuits $223_1$ to $223_L$, $224_1$ to $224_L$ and 227 and searches for the maximum value. When the absolute value calculating circuit which corresponds to the maximum output belongs to the first absolute value calculating circuit set, the comparator 228 judges that the first reception signal 213 is leading in phase. On the other hand, when the maximum value is outputted from any one of the absolute value calculating circuits belonging to the second absolute value calculating circuit set, the comparator 228 judges that the second reception signal 214 is leading in phase. However, when the output of the absolute value calculating circuit 227 corresponding to $m=0$ is the maximum value, the two reception signals 213 and 214 have the same phase, and accordingly, the comparator 228 may judge either one of them to be leading in phase. The result of the judgment Is outputted from the comparator 228 as an output comparison result 203 of the phase comparing circuit 210.

Figure 6:
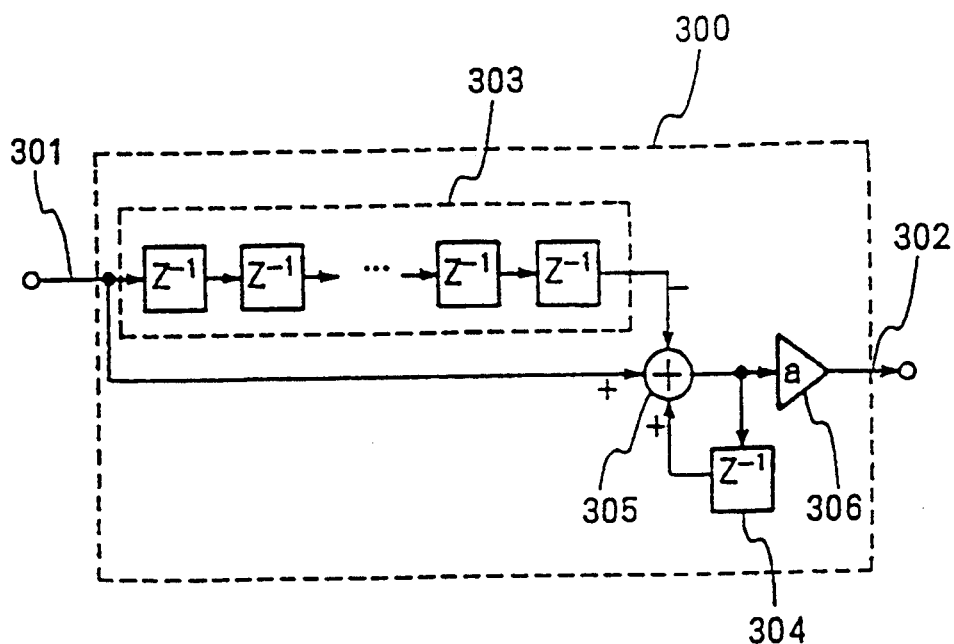
FIG. 6 is a block diagram showing an integrator for use with the phase comparing circuit of FIG. 5.

While the phase comparing circuit 210 Includes the integrators $221_1$ to $221_L$, $222_1$ to $222_L$ and 226, each of the integrators may be constructed in the following manner. In particular, FIG. 6 shows a first form of integrator in a block diagram. The integrator 300 shown in FIG. 6 is a simple mean calculating circuit and outputs the result of the integration of an input signal 301 as an output signal 302. In particular, the integrator 300 is composed of a delay circuit 303 for D samples, a second delay circuit 304, an adder 305 and a coefficient multiplier 306. The input signal 301 is supplied to the adder 305 and stored into the first delay circuit 303. The first delay circuit 303 delays the input signal 301 by a time corresponding to D samples and supplies the thus delayed signal to the adder 305. The adder 305 adds the output value of the second delay circuit 304 to the input signal 301 and then subtracts the output of the first delay circuit 303 from the sum. The output of the adder 305 is stored into the second delay circuit 304 and transmitted to the coefficient multiplier 306. The coefficient multiplier 306 multiplies the output of the adder 305 by a and outputs the product as the output 302 of the integrator 300. The coefficient a is an arbitrary positive value, and when $a=1/D$, the result of integration is a simple mean of the input signals.

While here the input signal 301 to the Integrator 300 is supplied to the first delay circuit 303 and adder 305, the output of the adder 305 is multiplied by a by the coefficient multiplier 306, and the product is outputted as the output signal 302 of the integrator 300, the location of the coefficient multiplier 306 may be changed such that the input signal 301 to the integrator 300 is supplied to and multiplied by a by the coefficient multiplier 306, and the product is supplied to the first delay circuit 303 and adder 305 in order that the output signal 302 of the integrator 300 may be provided by the output of the adder 305.

Figure 7:
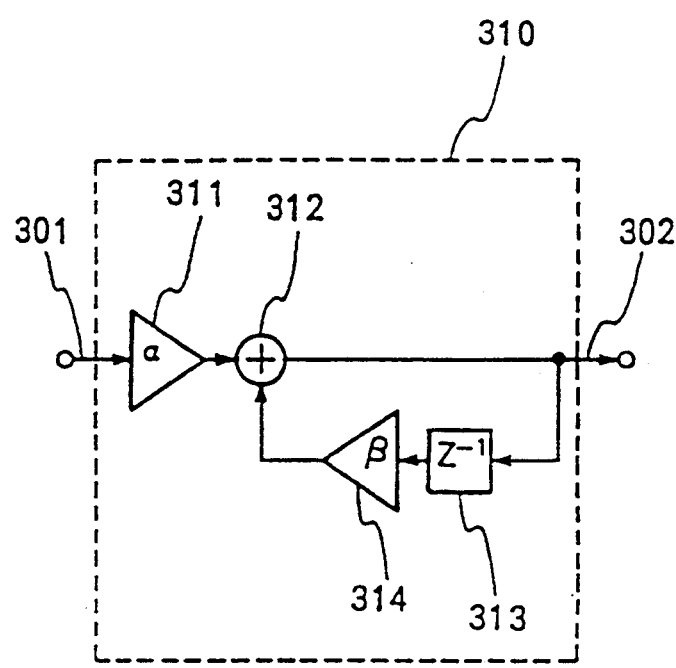
FIG. 7 is a block diagram showing another integrator for use with the phase comparing circuit of FIG. 5.

A different form of integrator may be employed in the phase comparing circuit 210 described above. FIG. 7 shows a second form of integrator 310 which is of the first order recursive type and is composed of a first coefficient multiplier 311, an adder 312, a delay circuit 313 and a second coefficient multiplier 314, and which integrates an input signal 301 and outputs the result of the integration as an output signal 302. The first coefficient multiplier 311 multiplies the input signal 301 to the integrator 310 by $\alpha$ and supplies the product to the adder 312. The adder 312 adds the products of the first and second multipliers 311 and 314 and outputs the sum as the output signal 302 of the integrator 310. The sum is also supplied to the delay circuit 313. The delay circuit 313 delays the sum from the adder 312 by a one sample time period and supplies the thus delayed signal to the second coefficient multiplier 314. The second coefficient multiplier 314 multiplies the output of the delay circuit 313 by $\beta$ and supplies the product to the adder 312. Here. $\alpha$ is an arbitrary positive value, and $\beta$ is a constant within the range of $0<\beta<1$. When $\beta=1-\alpha$ ($0<\alpha<1$), the output signal 302 of the integrator 310 is a weighted moving average of the input signal 301.

While the input signal 301 to the integrator 310 here is multiplied by $\alpha$ by the first coefficient multiplier 311 and the product is supplied to the adder 312, the output of which is outputted as the output signal 302 of the integrator 310, the location of the coefficient multiplier 311 may be changed such that the input signal 301 to the integrator 310 is supplied to the adder 312 and the first coefficient multiplier 311 multiply the output of the adder 312 by $\alpha$ so that the product may be outputted as the output signal 302 of the integrator 310.

Further, while the integrators described above are described as first order integrators, they may be of any order number. A recursive integrator is advantageous in that it can integrate over a long period of time with comparatively little hardware and is resistant to noise.

Figure 8:
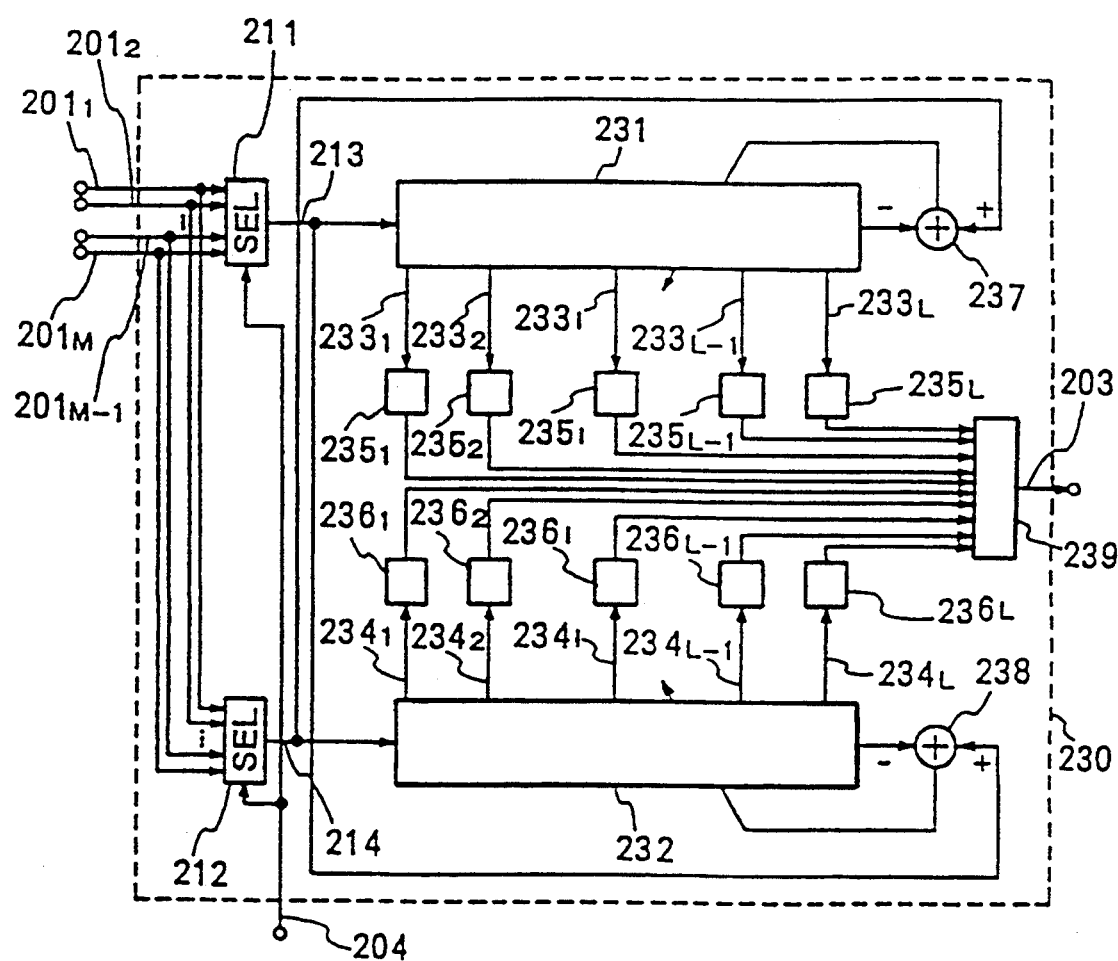
FIG. 8 is a block diagram showing another phase comparing circuit for use with the phase difference detecting circuit of FIG. 4.

While only one form of the phase comparing circuit 210 has been described so far, it may otherwise be constructed using adaptive filters. FIG. 8 is a block diagram showing a phase comparing circuit 230 which employs adaptive filters. The phase comparing circuit 230 also receives M channels of reception signals $201_1$ to $201_M$ and compares the two signals 213 and 214 of the reception signals which are designated by a controlling signal 204. The phase comparing circuit 230 thus outputs, as a result 203 of the comparison, the signal which is leading in phase.

Comparison in phase is performed using filter coefficients of two adaptive filters for predicting two signals relative to each other. At one of the two adaptive filters which receives a leading signal and predicts the other lagging signal, the maximum absolute value of the filter coefficient is presented at the tap which delays the input signal by the time difference nearest the difference between the two signals. On the other hand, when an adaptive filter receives a lagging signal and predicts the other leading signal, the filter coefficient does not reach a sufficient value because the accuracy in prediction of the leading signal is low. Accordingly, the filter coefficients of such an adaptive filter are of a lower value than for when a lagging signal is predicted.

Based on this fact, the two reception signals 213 and 214 are predicted relative to each other by the two adaptive filters, and the one which is leading in phase is determined based upon which adaptive filter presents the maximum absolute value of the coefficients of the adaptive filters.

One of the two signals designated by a controlling signal 204 for designating reception signals as objects for comparison in phase is selected by a first selector 211 to which the reception signals $201_1$ to $201_M$ are inputted, and this signal is supplied as a first reception signal 213 to a first adaptive filter 231 and a second subtracter 238. The other of the two signals designated by the controlling signal 204 is selected by a second selector 212 to which the reception signals $201_1$ to $201_M$ are inputted, and this signal is supplied as a second reception signal 214 to a second adaptive filter 232 and a first subtracter 237.

The first L-tap adaptive transversal filter 231 to which the first reception signal 213 is inputted predicts the second reception signal 214 and supplies the thus predicted signal to the first subtracter 237. The first subtracter 237 subtracts the output of the first adaptive transversal filter 231 from the second reception signal 214. The first adaptive transversal filter 231 is controlled so as to minimize the output of the first subtracter 237.

The second L-tap adaptive transversal filter 232 to which the second reception signal 214 is inputted predicts the first reception signal 213 and supplies the thus predicted signal to the second subtracter 238. The second subtracter 238 subtracts the output of the second adaptive transversal filter 232 from the first reception signal 213. The second adaptive transversal filter 232 is controlled so as to minimize the output of the second subtracter 238.

The first and second adaptive filters 231 and 232 are constructed so as to output filter coefficients $233_1$ to $233_L$ and $234_1$ to $234_L$, respectively, from individual taps thereof. The filter coefficients $233_1$ to $233_L$ of the first adaptive filter 231 are inputted to L absolute value calculating circuits $235_1$ to $235_L$, respectively, which generally make up a first absolute value calculating circuit set. Similarly, the filter coefficients $234_1$ to $234_L$ of the second adaptive filter 232 are inputted to L absolute value calculating circuits $236_1$ to $236_L$, respectively, which generally make up a second absolute value calculating circuit set. Outputs of the absolute value calculating circuits $235_1$ to $235_L$ and $236_1$ to $236_L$, that is, the absolute values obtained, are supplied to a comparator 239.

The comparator 239 compares the received outputs of the absolute value calculating circuits $235_1$ to $235_L$ and $236_1$ to $236_L$ to find the maximum value among them. Then, when the maximum value thus found is outputted from any one of the absolute value calculating circuits $235_1$ to $235_L$ belonging to the first absolute value calculating circuit set, the comparator 239 judges that the first reception signal 213 is leading in phase. When the maximum value is outputted from any one of the absolute value calculating circuits $236_1$ to $236_L$ belonging to the second absolute value calculating circuit set, the comparator 239 judges that the second reception signal 214 is leading in phase. The comparator 239 outputs the result of such comparison as a comparison result 203 of the phase comparison circuit 230.

The multi-channel echo canceling apparatus according to the present invention and the multi-channel echo canceling method according to the present invention which utilizes the apparatus have so far been described. While the multi-channel echo canceling apparatus 100 shown in FIG. 3 is described by way of an example in which the first and second reception signals 11 and 12 and the first and second mixed signals 24 and 25 are involved, the present invention can be applied to other cases in which a plurality of reception signals and a single transmission signal or a plurality of transmission signals are involved. Further, while the multi-channel echo canceling apparatus is employed to cancel acoustic echoes derived from reception signals propagated by loudspeakers and conducted along spatial acoustic paths and picked up by microphones, it can be applied also to the cancellation of such echoes as, for example, those caused by crosstalk of a circuit. Further, while an adaptive transversal filter based on the LMS algorithm is employed for the first and second adaptive filters 103 and 104, an arbitrary adaptive filter can be employed in the multi-channel echo canceling apparatus. For example, when an adaptive transversal filter based on a learning identification method is employed, output signals of the adaptive filters are given similarly by equations (22) and (23), respectively, but an updated filter coefficient is given by $$w_i(n + 1) = w_i(n) + \mu \frac{e(n)x(n - i)}{\sum_{i=0}^{N-1} x^2(n - i)} \tag{35}$$

As an adaptive algorithm for the adaptive filters, algorithms such as the sequential regression algorithm (SRA) disclosed in B. Widrow et al., "Adaptive Signal Processing", (Prentice-Hall, N.J., 1985) or the RLS algorithm disclosed in M. L. Honig et al., "Adaptive Filters", (pp. 145–245, Kluwer Academic Publishers, Hingham, Ma. 02043, U.S.A.) can be employed. Alternatively, an adaptive recursive filter may be employed in place of an adaptive transversal filter. A further option is to use a sub-band adaptive filter or an adaptive filter of a "frequency domain" or "transformed domain."

Computer simulations have been performed for the multi-channel echo canceling method according to the present invention, and the results of these computer simulations are described below. First, the conditions common to the simulations are described.

Two channels of reception signals were assumed and are individually referred to as the left reception signal and the right reception signal for simplification of description. The two reception signals were inputted to a pair of FIR (finite impulse response) filters having 20 taps to simulate echoes. The multi-channel echo canceling apparatus shown in FIG. 3 was employed as an object for simulation. Because of the symmetry of the left and right channels, the right channel echo was investigated in these simulations. In this instance, an FIR adaptive filter having 40 taps was employed for the adaptive filters, and the FIR adaptive filters were constructed such that weighting coefficients for them were determined by a learning method (normalized LMS). The step size $\mu$ was consequently 0.5. Further, the phase comparing circuit shown in FIG. 5 based on cross correlation functions (that is, based on a tapped-delay-line) was employed as a phase comparing circuit, and the recursive integrator shown in FIG. 6 was employed for integrators.

Simulation 1

White noise was used as the right reception signal, and the signal obtained by delaying the right reception signal by an 8 sample distance through a delay circuit was used as the left reception signal. White noise elements independent of the reception signals were further added as noise to the echo so as to attain an S/N ratio of 40 dB.

Under these conditions, the variation in the echo return loss enhancement (ERLE) was evaluated. When the input echoes are represented by d(n) and residual echoes remaining in an output are represented by e(n), the ERLE is defined as $$ERLE = 20 \log_{10} \frac{d(n)}{e(n)} \tag{36}$$

Figure 9:
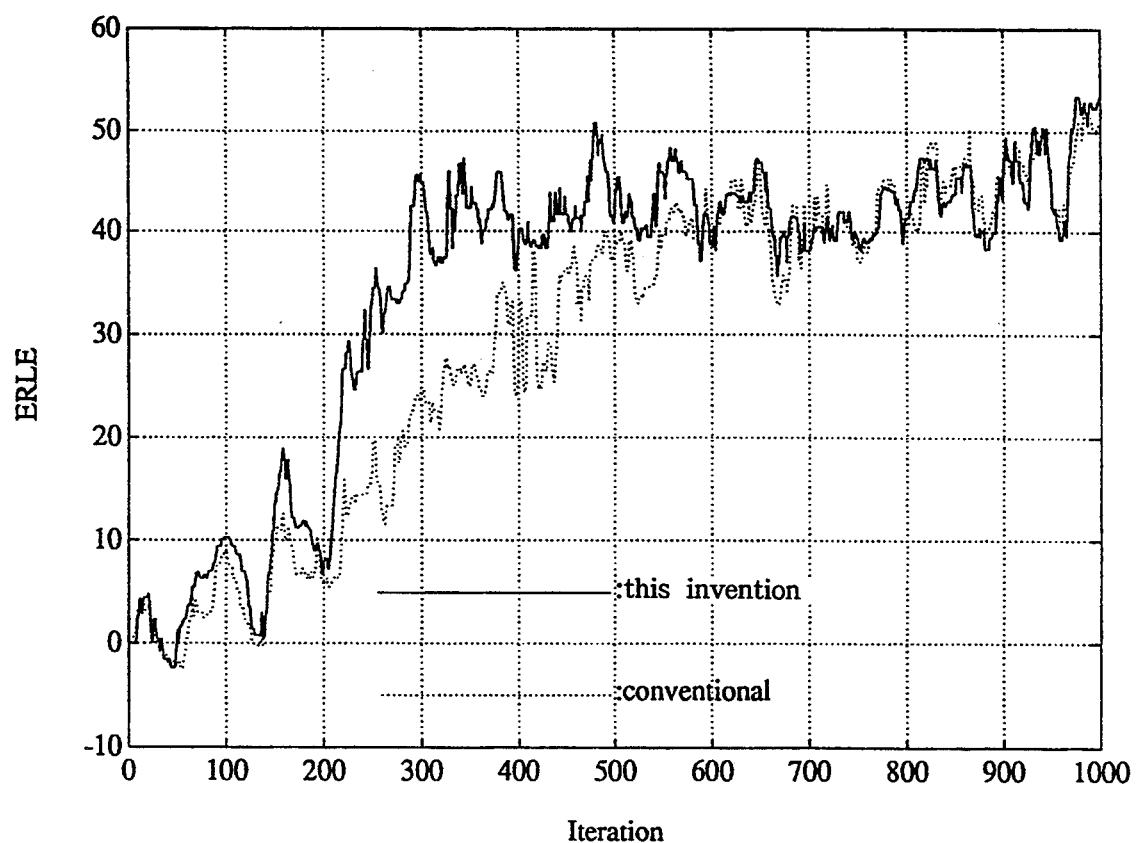
FIG. 9 is a characteristic diagram showing the variation of the echo return loss enhancement (ERLE) with respect to time in simulation 1.

The results obtained are indicated by a curved solid line in FIG. 9. The axis of abscissa In FIG. 9 represents the iterations, that is, the number of updating operations of the filter coefficients.

Figure 1:
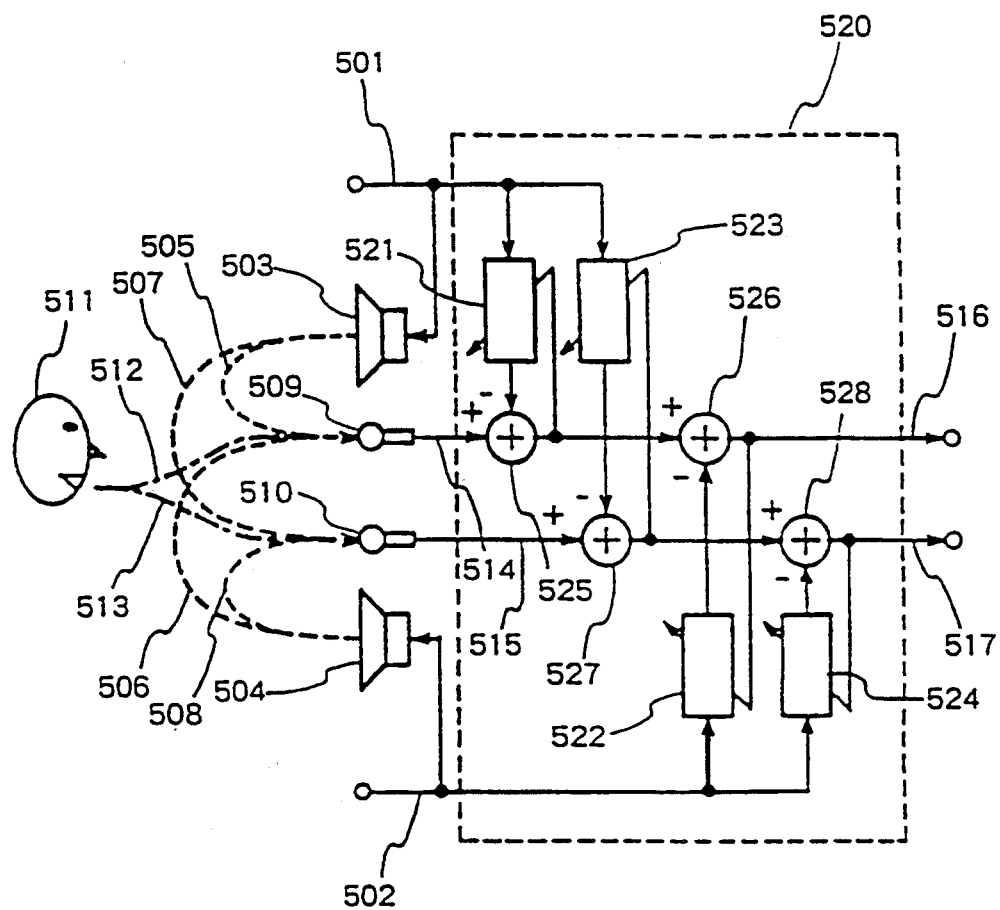
FIG. 1 is a block diagram showing a conventional multi-channel echo canceling apparatus of the serially connected type.
Figure 2:
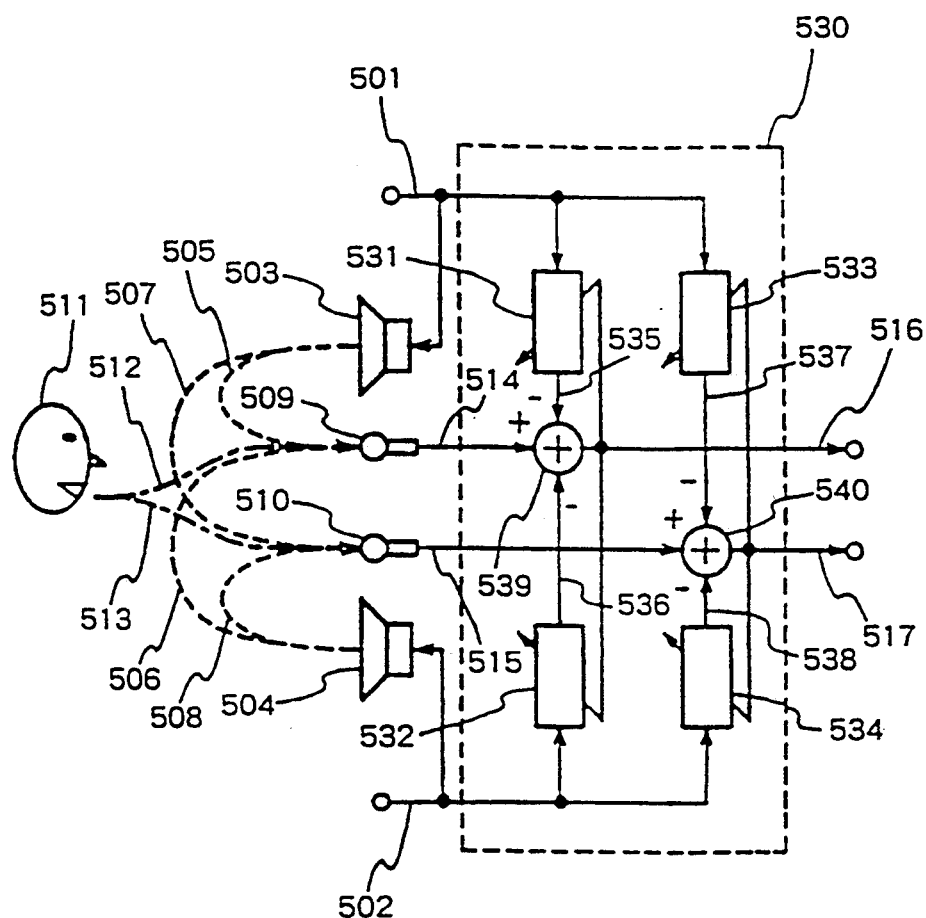
FIG. 2 is a block diagram showing another conventional multi-channel echo canceling apparatus of the linear combiner type.

A similar simulation was conducted with a conventional multi-channel echo canceling apparatus described above with reference to FIG. 2 under similar conditions with regard to reception signals, echo production, and filters. The dotted line In FIG. 9 indicates the variation of the ERLE with respect to time. Comparison of the two results reveals that the method according to the present invention results in a quicker rise of the ERLE, that is, a more rapid convergence of adaptive filters than for the conventional method.

Further, since the present case is a simulation, a theoretical optimal value of each weighting coefficient of each adaptive filter can be found by calculation. Thus, the differences between the optimal values of each filter coefficient and the actual filter coefficients in the simulation were calculated, and a squared-sum of the same was determined as the distance from the optimal value. The variation of the distance calculated in this manner with respect to time is indicated by the solid line in FIG. 10. It is to be noted that in FIG. 10, the distance is normalized with its initial value set at 1.

Figure 10:
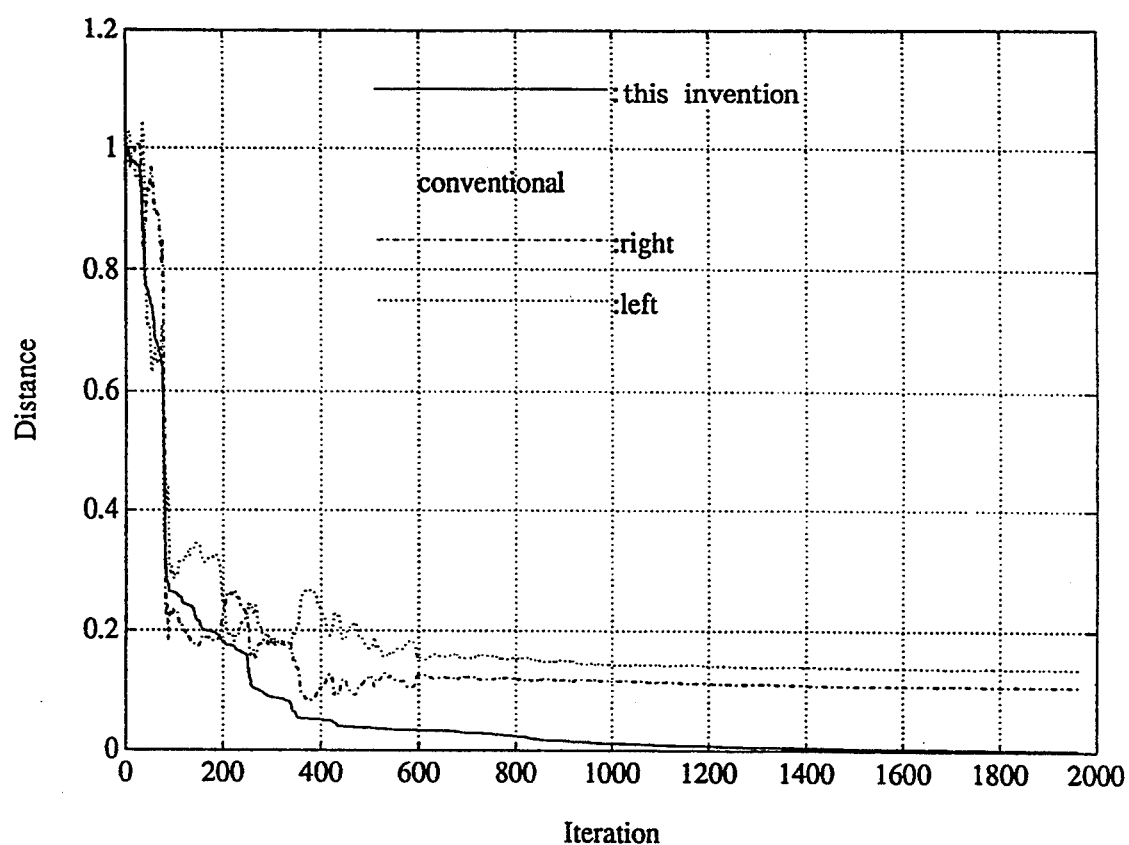
FIG. 10 is a characteristic diagram showing the variation of the squared sums of difference values between the coefficients of adaptive filters and their optimal values in simulation 1.

Further, the distance was also found for the conventional method and is indicated by a dotted line (left) and an alternate long and short dash line (right) in FIG. 10. These two results for the conventional method are shown because, according to the conventional method, a pair of adaptive filters are provided, one for left and one for right reception signals. It can be seen from these results that, according to the method of the present invention, filter coefficients converge closely to optimal values. In contrast, filter coefficients obtained by the conventional method do not converge to optimal values.

Simulation 2

Male speech obtained by sampling at the rate of 8 Khz was used as the right reception signal, and the signal obtained by delaying the right reception signal by an 8 sample distance was used as the left reception signal. It is to be noted that no noise was employed in this simulation.

Figure 11:
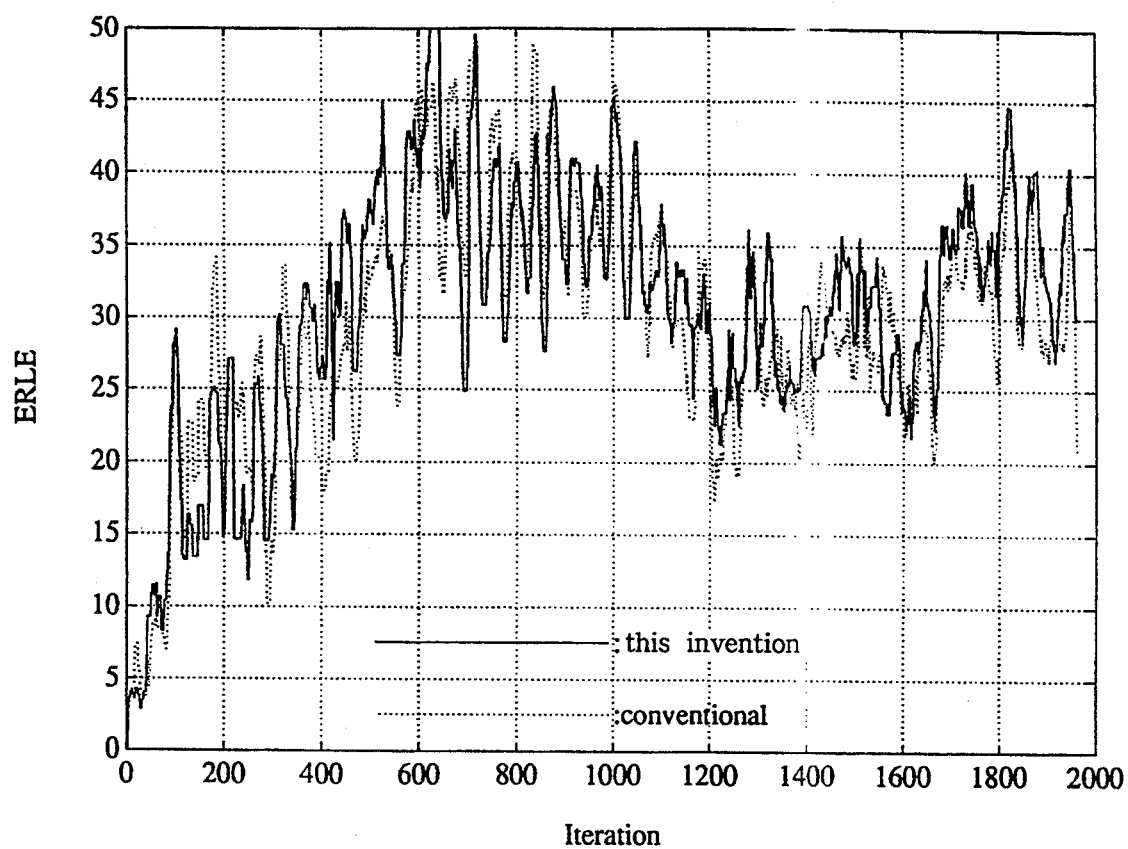
FIG. 11 is a characteristic diagram showing the variation of the ERLE with respect to time in simulation 2.
Figure 12:
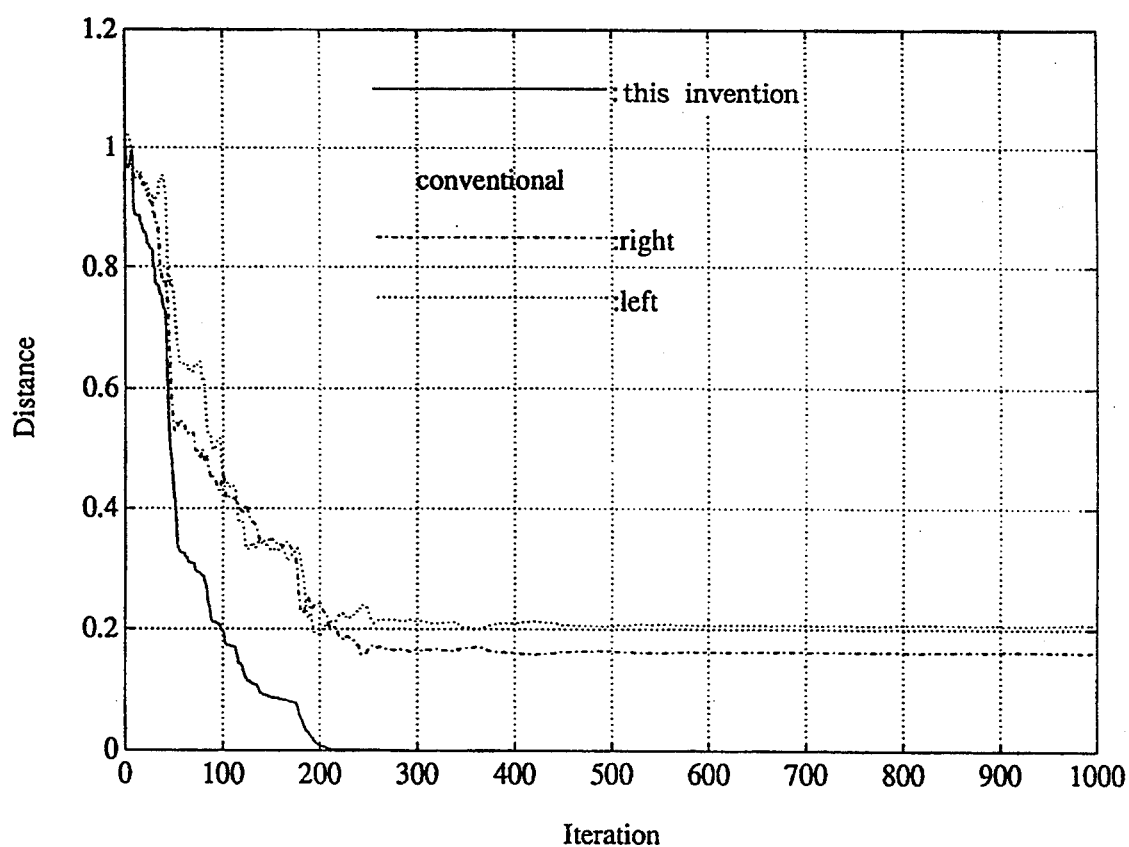
FIG. 12 is a characteristic diagram showing the variation of the squared sums of difference values between coefficients of the adaptive filters and their optimal values in simulation 2.

As for Simulation 1 described above, the variation of the ERLE with respect to time was found using both the method of the present invention and the conventional method, and the results are shown in FIG. 11. Variations of the distance from the optimal value with respect to time were also found and are shown in FIG. 12. It can be seen from FIGS. 11 and 12 that the method of the present invention presents a more rapid convergence and allows a closer convergence to the optimal values.

Simulation 3

Over the course from 0 to 960 iterations of the updating operation of the filter coefficients of the adaptive filter, the right reception signal was white noise while the left reception signal was a signal obtained by delaying the right reception signal by a 6 sample distance. After the 960th iteration, the left reception signal was changed to white noise while the right reception signal was changed to another signal obtained by delaying the left reception signal by a 4 sample distance. Further, white noise elements independent of the reception signals were applied the echo so as to present an S/N ratio of 40 dB.

Figure 13:
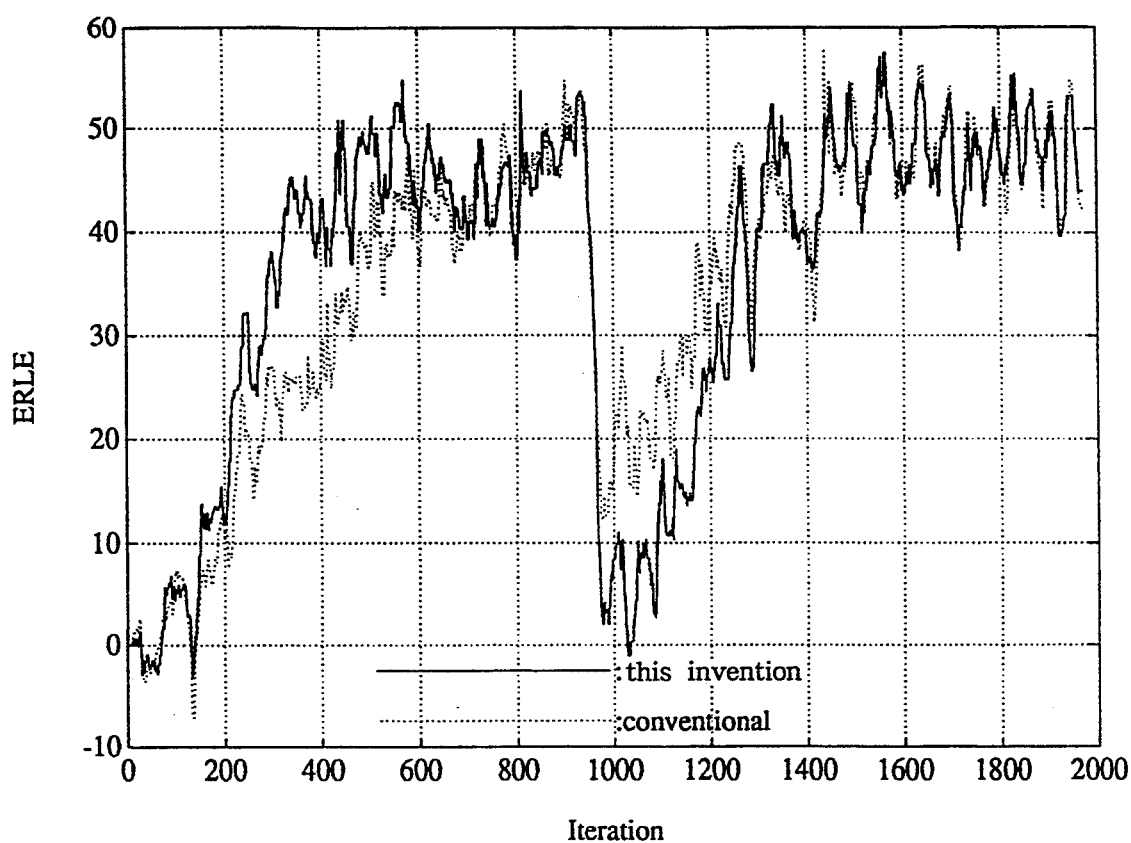
FIG. 13 is a characteristic diagram showing the variation of the ERLE with respect to time in simulation 3.
Figure 14:
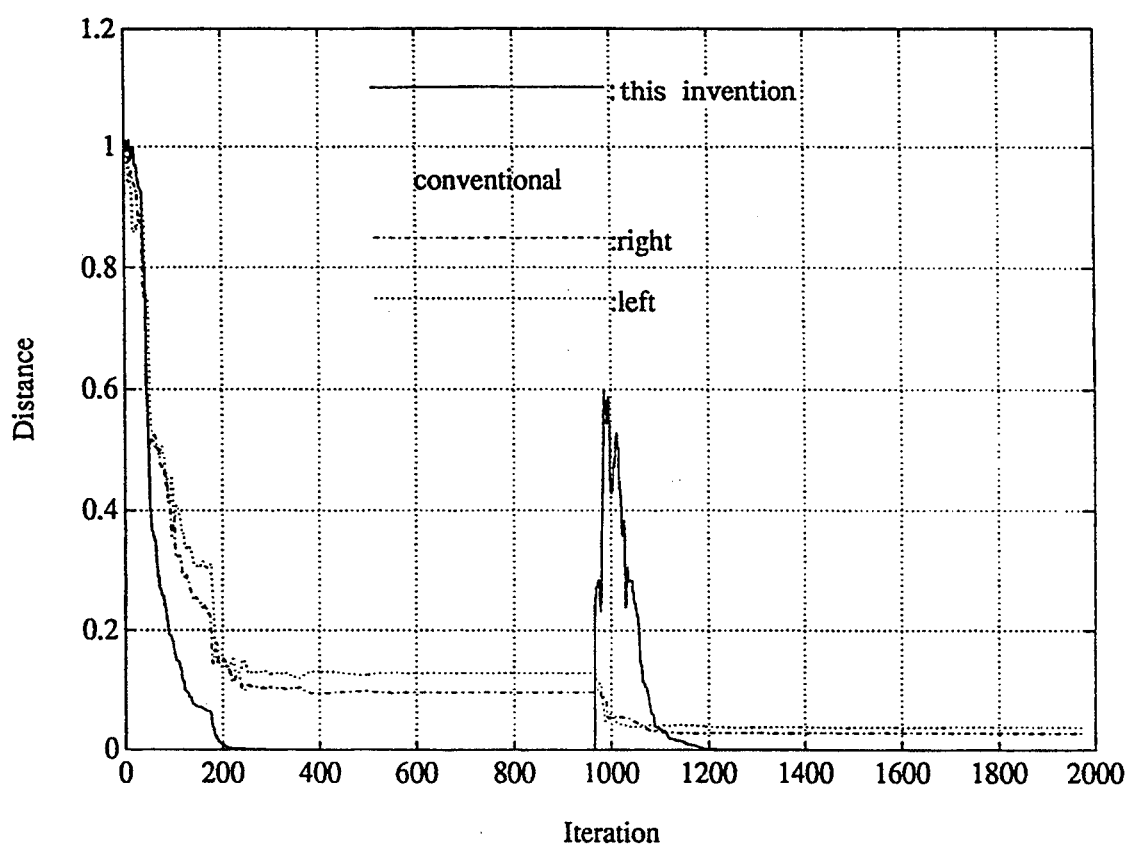
FIG. 14 is a characteristic diagram showing the variation of the squared sums of difference values between the coefficients of the adaptive filters and their optimal values in simulation 3.

As in the two simulations described above, the variation of the ERLE with respect to time and the variation in the distance from the optimal value with respect to time were found for the method of the present invention and for the conventional method, and the results are shown in FIGS. 13 and 14. Since the reception signal which was leading in phase was changed at the 961st iteration, the ERLE and the distance show a significant deterioration at this point. In spite of this disturbance, however, it is clearly shown that the method of the present invention achieves a quick convergence and allows convergence to the optimal value.

It is to be understood that variations and modifications of the multi-channel echo canceling method and apparatus disclosed herein will be evident to one skilled in the art, and it is intended that all such modifications and variations be included within the scope of the appended claims.

What is claimed is:

1. A multi-channel echo canceling method of subtracting, from a mixed signal or signals in which echoes produced from a plurality of reception signals are mixed with a transmission signal or signals, a replica of the echoes in order to cancel the echoes of the mixed signal or signals, the method comprising at least the steps of:
   selecting the reception signal that is most leading in phase; and
   producing a replica of the echoes from the selected reception signal.

2. A multi-channel echo canceling method as claimed in claim 1, wherein the selected reception signal is inputted to adaptive filters provided in one-to-one correspondence with the mixed signal or signals to produce a replica of the echoes.

3. A multi-channel echo canceling method as claimed in claim 2, wherein each of the reception signals include therein a signal component from a single signal source.

4. A multi-channel echo canceling method as claimed in claim 3, wherein the reception signals and the transmission signal or signals are derived from speech.

5. A multi-channel echo canceling method as claimed in claim 3, wherein the step of selecting the reception signal which is most leading in phase includes a step of finding a phase difference between two arbitrary reception signals, said step of finding the phase difference including a step of finding the sign (positive or negative) of the time difference which maximizes the absolute value of a cross correlation function between the two reception signals.

6. A multi-channel echo canceling method as claimed in claim 5, wherein said cross correlation function is determined such that, at each of a predetermined plurality of times denoted as first times, the product of the value of the first of the two reception signals at a first time and the value of the second reception signal at a second time, said second time being separated from said first time by a predetermined time difference, is calculated, and the average value of said product over time is calculated and determined to be the value of the cross correlation function for the time difference between the two reception signals.

7. A multi-channel echo canceling method as claimed in claim 5, wherein the cross correlation function is determined such that, at each of a predetermined plurality of times denoted as first times, the product of the value of the first of two reception signals at a first time and the value of the second reception signal at a second time, said second time being separated from said first time by a predetermined time difference, is calculated, and a recursive integrated value having a predetermined time constant is calculated with regard to the products and is determined to be the value of the cross correlation function for the time difference between the two reception signals.

8. A multi-channel echo canceling method as claimed in claim 3, wherein the step of selecting the reception signal which is most leading In phase comprises the steps of:
   finding the time difference which maximizes the absolute value of the cross correlation function between two arbitrary reception signals as objects for judgment of the phase difference;
   judging, from the sign (positive or negative) of the time difference, which one of the two reception signals is lagging in phase;
   eliminating the reception signal which is judged to be lagging in phase as an object for judgment; and
   repeating the above three steps until all but a single reception signal are eliminated.

9. A multi-channel echo canceling method as claimed in claim 8, wherein the cross correlation function is determined such that, at each of a predetermined plurality of times denoted as first times, the product of the value of the first of two reception signals at a first time and the value of the second reception signal at a second time, said second time being separated from said first time by a predetermined time difference, is calculated, and the average value of the product over time is calculated and determined to be the value of the cross correlation function for the time difference between the two reception signals.

10. A multi-channel echo canceling method as claimed in claim 8, wherein the cross correlation function is determined such that, at each of a predetermined plurality of times denoted as first times, the product of the value of the first of two reception signals at a first time and the value of the second reception signal at a second time, said second time being separated from said first time by a predetermined time difference, is calculated, and a recursive integrated value having a predetermined time constant is calculated with regard to the products and is determined to be the value of the cross correlation function for the time difference between the two reception signals.

11. A multi-channel echo canceling method as claimed in claim 3, wherein the step of selecting the reception signal that is most leading in phase comprises the steps of:
  selecting two arbitrary reception signals as objects for judgment of the phase difference;
  finding filter coefficients of an adaptive transversal filter when the first reception signal of the two reception signals is inputted to said adaptive transversal filter to predict the second reception signal of the two reception signals and filter coefficients of a second adaptive transversal filter when the second reception signals is inputted to said second adaptive transversal filter to predict the first reception signal;
  comparing a first absolute value which is the maximum absolute value of the filter coefficients when the second reception signal is predicted from the first reception signal with a second absolute value which the maximum absolute value of the filter coefficients when the first reception signal is predicted from the second reception signal in order to judge which of the two reception signals is lagging in phase;
  eliminating the reception signal which Is judged to be lagging in phase as an object for judgment; and
  repeating the above four steps until all but a single reception signal are eliminated.

12. A multi-channel echo canceling apparatus for subtracting, from a mixed signal in which an echo produced from a plurality of reception signals are mixed with a transmission signal or signals, a replica of the echo in order to cancel the echo of the mixed signal or signals, comprising:
  a phase difference detecting circuit for receiving the reception signals and detecting the reception signal which is most leading in phase;
  a selector for receiving the reception signals and selectively outputting, in accordance with the results of the detection by said phase difference detecting circuit, the reception signal which is most leading in phase;
  an adaptive filter provided in one-to-one correspondence with the mixed signal for receiving the output of the selector and producing and outputting a replica of the echo; and
  a subtracter provided in one-to-one correspondence with the mixed signal for subtracting the output of the adaptive filter from the mixed signal;
  the adaptive filter being controlled so as to minimize the output of the subtracter.

13. A multi-channel echo canceling apparatus as claimed in claim 12, wherein each of the reception signals include therein a signal component from a single signal source.

14. A multi-channel echo canceling apparatus as claimed in claim 13, wherein the reception signals and the transmission signal are derived from speech.

15. A multi-channel echo canceling apparatus as claimed in claim 13, wherein said apparatus receives a plurality of such mixed signals and comprises a plurality of such adaptive filters and subtracters, the adaptive filters and subtracters both being equal in number to the number of mixed signals.

16. A multi-channel echo canceling apparatus as claimed In claim 13, wherein said phase difference detecting circuit comprises:
  at least one phase comparing circuit responsive to a controlling signal which designates two reception signals which are to be compared in phase with each other for the purpose of comparing the phases of the two designated reception signals and outputting the result of said comparison; and
  a controlling circuit responsive to the output or outputs of said phase comparing circuit or circuits for outputting a controlling signal to said phase comparing circuit or circuits so as to detect which one of the reception signals is most leading in phase and outputting the result of such detection.

17. A multi-channel echo canceling apparatus as claimed in claim 16, wherein said phase comparing circuit or circuits each comprise:
  a first selector for receiving reception signals and outputting one of the reception signals designated by the controlling signal as the first reception signal;
  a second selector for receiving reception signals and outputting another reception signal designated by the controlling signal as the second reception signal;
  a first tapped-delay-line for delaying the first reception signal;
  a second tapped-delay-line for delaying the second reception signal;
  a plurality of multipliers belonging to a first multiplier set, one multiplier being provided for each tap of said first tapped-delay-line, for calculating the products of the outputs of the respective taps and the second reception signal;
  a plurality of integrators belonging to a first integrator set, one integrator being provided for each respective multiplier in said first multiplier set, for integrating the outputs of the corresponding multipliers;
  a plurality of absolute value calculating circuits belonging to a first absolute value calculating circuit set, one absolute value calculating circuit being provided for each respective integrator in said first integrator set, for calculating the absolute values of the outputs of the corresponding integrators;
  another plurality of multipliers belonging to a second multiplier set, one multiplier being provided for each individual tap of said second tapped-delay-line, for calculating the products of the outputs of the respective taps and the first reception signal;
  another plurality of integrators belonging to a second integrator set, one integrator being provided for each individual multiplier in said second multiplier set, for integrating the outputs of the corresponding multipliers;
  another plurality of absolute value calculating circuits belonging to a second absolute value calculating circuit set, one absolute value calculating circuit being provided for each individual integrator in said second integrator set, for calculating the absolute values of the outputs of the corresponding integrators;

a third multiplier for calculating the product of the first and second reception signals;

a third integrator for integrating the output of said third multiplier;

a third absolute value calculating circuit for calculating the absolute value of the output of said third integrator; and a comparator for comparing outputs of the absolute value calculating circuits included in said first and second absolute value calculating circuit sets and the output of said third absolute value calculating circuit with one another to judge which one of the first and second input signals is lagging.

18. A multi-channel echo canceling apparatus as claimed in claim 17, wherein each of the integrators comprises:

a first delay circuit for delaying an input signal to the integrator;

a second delay circuit for storing therein the output value of the integrator preceding the input signal; and an adder for adding the value stored in said second delay circuit and the input signal, storing in said second delay circuit the difference obtained by subtracting the output of said first delay circuit from the sum and outputting the difference as an output signal of the integrator.

19. A multi-channel echo canceling apparatus as claimed in claim 17, wherein each of the integrators comprises:

a first coefficient multiplier for multiplying an input signal to the integrator by a first constant;

a delay circuit for delaying an output signal of the integrator;

a second coefficient multiplier for multiplying an output of said delay circuit by a second constant; and an adder for adding the outputs of said first and second coefficient multipliers, outputting the sum as an output of the integrator and storing the sum in said delay circuit.

20. A multi-channel echo canceling apparatus as claimed in claim 17, wherein said comparator receives the outputs of the absolute value calculating circuits included in said first and second absolute value calculating circuit sets and the output of said third absolute value calculating circuit, and when a maximum received value is received from any of said absolute value calculating circuits included in said first absolute value calculating circuit set, judges that the first reception signal is leading in phase as compared with the second reception signal, and when a maximum received value is received from any of said absolute value calculating circuits included in said second absolute value calculating circuit set, judges that the second reception signal is leading in phase as compared with the first reception signal.

21. A multi-channel echo canceling apparatus as claimed in claim 16, wherein said phase comparing circuit or circuits each comprise:

a first selector for receiving the reception signals and outputting one of the two reception signals designated by the controlling signal as a first reception signal;

a second selector for receiving reception signals and outputting another reception signal designated by the controlling signal as a second reception signal;

a first adaptive transversal filter for receiving the first reception signal and predicting the second reception signal, said first adaptive transversal filter being capable of outputting a filter coefficient value for each of its taps;

a plurality of absolute value calculating circuits belonging to a first absolute value calculating circuit set, one absolute value calculating circuit being provided for each respective filter coefficient of said first adaptive transversal filter, for calculating the absolute values of the corresponding filter coefficients;

a second adaptive transversal filter for receiving the second reception signal and predicting the first reception signal, said second adaptive transversal filter being capable of outputting a filter coefficient value for each of its taps;

another plurality of absolute value calculating circuits belonging to a second absolute value calculating circuit set, one absolute value calculating circuit being provided for the respective filter coefficient of said second adaptive transversal filter, for calculating the absolute values of the corresponding filter coefficients; and a comparator for comparing the outputs of the absolute value calculating circuits included in said first and second absolute value calculating circuit sets to judge which one of the first and second reception signals is lagging in phase.

22. A multi-channel echo canceling apparatus as claimed in claim 21, wherein said comparator receives the outputs of the absolute value calculating circuits included in said first and second absolute value calculating circuit sets, and when a maximum received value is received from any of said absolute value calculating circuits included in said first absolute value calculating circuit set, judges that the first reception signal is leading in phase as compared with the second reception signal, and when a maximum received value is received from any of said absolute value calculating circuits included in said second absolute value calculating circuit set, judges that the second reception signal is leading in phase as compared with the first reception signal.

* * * * *